United States Patent
Scheuren

(10) Patent No.: US 6,877,538 B2
(45) Date of Patent: Apr. 12, 2005

(54) TIRE WITH NEW BEAD BUNDLE

(75) Inventor: Daniel Scheuren, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 218 days.

(21) Appl. No.: 10/303,497

(22) Filed: Nov. 25, 2002

(65) Prior Publication Data

US 2004/0099361 A1 May 27, 2004

(51) Int. Cl.$^7$ .................... B60C 15/00; B60C 15/024
(52) U.S. Cl. .................... 152/544; 152/450; 152/539; 152/540
(58) Field of Search ................ 152/539, 544

(56) References Cited

U.S. PATENT DOCUMENTS

| | | | |
|---|---|---|---|
| 3,171,162 A | 3/1965 | Soderquist | |
| 4,057,091 A | 11/1977 | Gardner et al. | 152/353 R |
| 4,580,610 A | 4/1986 | Jackson | 152/516 |
| 4,854,362 A | 8/1989 | Carolla et al. | 152/554 |
| 5,323,830 A | 6/1994 | Diernaz | |
| 5,526,863 A | 6/1996 | Hodges | 152/541 |
| 2001/0042582 A1 | 11/2001 | Bumpas, Jr. et al. | 152/540 |

FOREIGN PATENT DOCUMENTS

| | | | | |
|---|---|---|---|---|
| EP | 0 531 007 A1 | 3/1993 | | B60C/15/024 |
| EP | 0531007 | 3/1993 | | B60C/15/024 |
| EP | 0533425 | * | 3/1993 | |
| EP | 0 652 120 A1 | 5/1995 | | B60C/15/024 |
| EP | 1066993 | 1/2001 | | B60C/15/04 |
| GB | 1 542 133 | 3/1979 | | B60C/15/06 |
| JP | 1297310 | 11/1988 | | B60C/15/024 |
| JP | 11-208224 | * | 8/1999 | |
| JP | 2001-10311 | * | 1/2001 | |
| JP | 239812 | 9/2001 | | B60C/15/024 |
| JP | 2002-254908 | * | 9/2002 | |

* cited by examiner

*Primary Examiner*—Blaine Copenheaver
*Assistant Examiner*—Justin Fischer
(74) *Attorney, Agent, or Firm*—Richard B. O'Planick

(57) ABSTRACT

A pneumatic tire (10) has a tread portion (11), a pair of sidewall portions (13) and a pair of bead portions (14). Each bead portion (14) has a bead core (15), and each bead core (15) has a radially inner surface defining a bead core base (31). Radially inward of, and wider than, each bead core base (31) is a bead seat profile (20). The bead seat profile (20) provides an interference fit between the tire (30) and the ledge (42) of the wheel rim (40) to which the tire (10) is to be mounted. The bead seat profile (20) has at least two portions which are inclined at specific angles with respect to the radially inner surface of the bead core base The radially inner base (31) of the bead core (15) is substantially parallel to the bead seat profile.

8 Claims, 3 Drawing Sheets

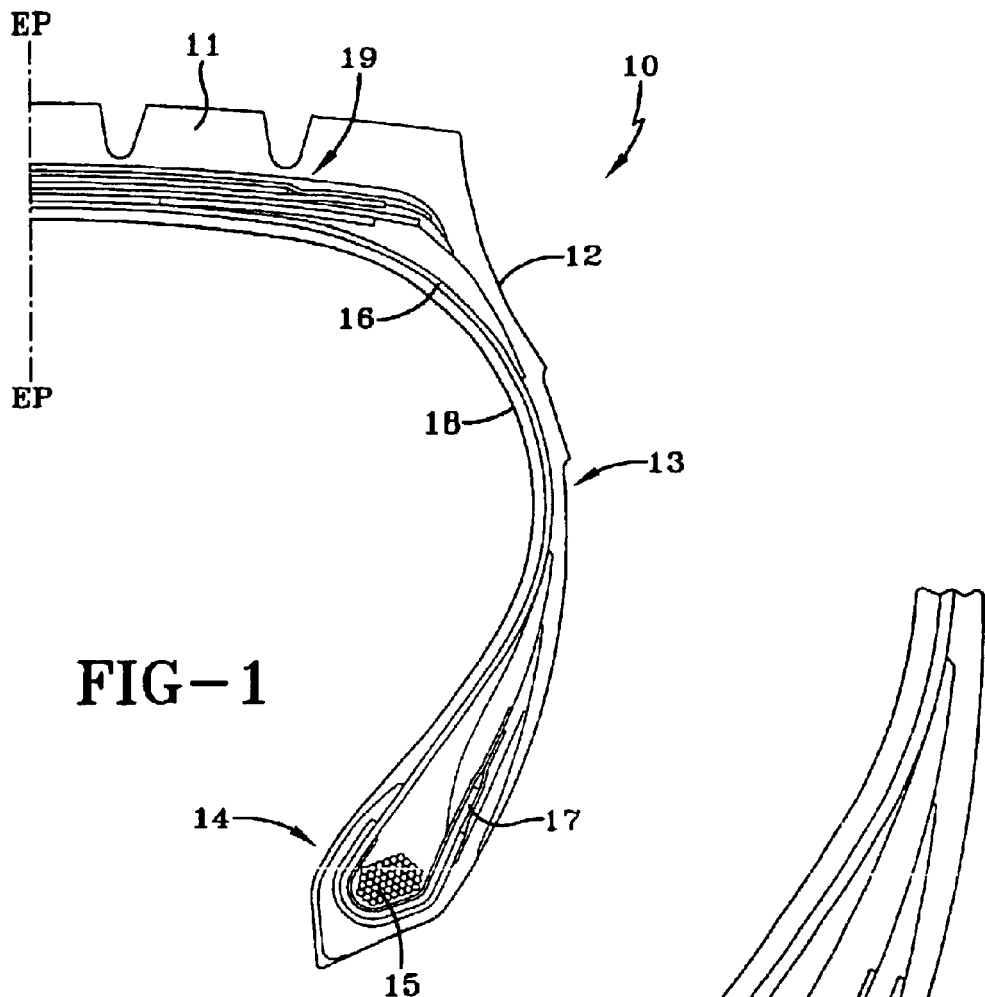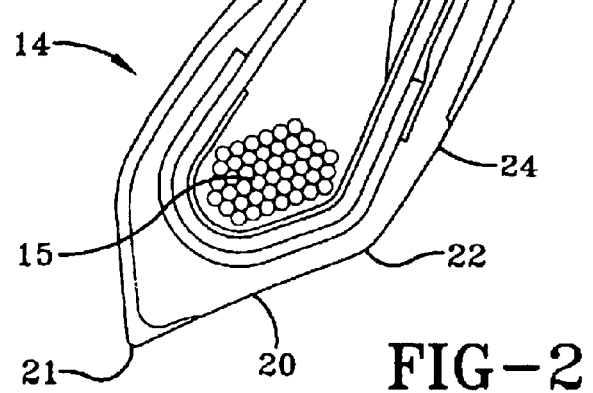

TIRE WITH NEW BEAD BUNDLE

FIELD OF THE INVENTION

This invention relates to all types of radial ply rim-fitting pneumatic tires, tubed and tubeless, and more specifically to truck tires, bus tires and off-the-road tires mounted on 15° drop center rims. More particularly this invention discloses a unique bead profile having improved durability, low weight and excellent seat on the rim.

BACKGROUND OF THE INVENTION

The portion of a tire comprising the bead core, apex and other reinforcing rubber strips form the tire bead and are designed so as to anchor the tire on the rim. The bead core is substantially inextensible in the circumferential direction and can be built up of a single or several elements, such as steel wire or cords. The diameter of the radially innermost surface of the bead core or bead core base corresponds roughly to the diameter of the rim bead seats except for the width of the carcass ply, chafer, apex and possibly other thin rubber linings. The tire's bead diameter is smaller than the rim's diameter, thereby yielding an interference fit when the tire is mounted onto the rim. Contact pressure of the tire on the rim depends on the geometrical relationship between the tire's bead area and the rim, the construction and position of the bead core, the inflation pressure, and other tire loads such as vertical, lateral, and centrifugal forces. The larger the contact pressure, the tighter the fit of the tire on the rim. If rim slip is of concern, one may consider reducing the tire's diameter to make the fit tighter. However, with the increased interference, the required inflation pressure to mount the tire may become so high as to impose danger to the operator.

Due to the rigidity of the bead cores, mounting of the tires on the rim requires deformation of the beads from a circular to an oval shape and application of forces approaching limits of elastic deformability of the steel wires or cords. Reducing the section of the bead and more specifically the section of the bead core would facilitate the mounting of the tire on the rim. However reducing the material in the bead will also work against a stable seat of the tire on the rim Under high inflation pressures the bead will have a tendency to jump over the rim flange. Standard burst resistance tests, such as inflating the tire under a (water) pressure of about 450 psi (3,000 kPa), will no more be met. The tire will either bounce over the rim flange or the textile reinforcements in the bead area will break.

U.S. Pat. No. 5,263,526 discloses a pneumatic tire having a specified bead structure allowing an improved seat of the bead on the rim. The cross-section of the bead core is roughly triangular and the width of the bead heel surface is approximately equal to the distance between a hump and an axially inward surface of the wheel flange.

U.S. Pat. No. 4,580,610 discloses a tire bead seat having taper angle which is greater than that of the rim bead seat such that on fitment of the tire to the rim the annular bead member and the associated edge of the carcass ply rotate around the bead core and cause the carcass ply to be placed under tension. In one embodiment the taper angle may be around 30°.

In U.S. Pat. No. 5,464,051 to Beard et al, a specified bead seat profile for passenger tires was proposed whereby the bead seat had a single taper angle of about 6.5° for a rim with a ledge taper of 5°. It was claimed for a cylindrical strap bead core with a flat base that the uniform compression of the rubber gauge under the bead core reduced the variability in the mounting pressure. Beard's comparative control tire of the prior art had an angular bead seat profile having a 5° and a 10.5° taper angle combination. The 5° to 10.5° transition point was close to the heel.

The present invention departs from the prior art approaches in that the focus is placed on the interaction of the bead core base and the angular orientation of the bead seat profile.

A first object of the invention is to reduce bead deformation and more specifically to improve toe lift properties of tires during their lifetime. A further object is to improve mountability of tires on the rims. A still further object is to reduce the tires' weight without diminishing their burst resistance.

SUMMARY OF THE INVENTION

A pneumatic tire has a tread portion, a pair of sidewall portions and a pair of bead portions. Each bead portion has a bead core, and each bead core has a radially inner surface defining a bead base. Radially inward of, and wider than, each bead base is a bead seat profile. The bead seat profile has several inclined portions inclined at angles comprised between 0° to 15° with respect to the radially inner surface of the bead core. The bead seat profile in combination with the bead core base provides an interference fit between the tire and the ledge of the wheel rim to which the tire is to be mounted. When the tire is mounted and inflated the interference distribution on the whole base width is optimized.

The bead core can be of any cross-sectional shape, including, but not limited to triangular, rectangular, hexagonal provided that the radially inner portion is substantially straight.

With the bead core according to the present invention, the ply line can be designed closer to its theoretical optimum equilibrium and therefor the ply line remains stable throughout the tire life. The bead seat profile is designed to improve the seat of the bead base on the rim and to increase the retreadability of the tire.

DEFINITIONS

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member typically attached to or wrapped by ply cords and shaped, with or without other reinforcement elements such as flippers, chippers, apexes, toe guards and chafers, to fit the design rim.

"Belt structure" or "Reinforcing Belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Design rim" means a rim having a specified configuration and width. For the purposes of this Specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organisation-Standards Manual and the term design rim means the same as the standard measurement rims. In Japan, the standard organization is The Japan Automobile Tire Manufacturer's Association.

"Design rim width" means the specified distance axially between rim flanges. For the purpose of this specification, the design rim width (D) is taken as (the minimum recommended rim width plus the maximum recommended rim width)/2 as specified by the appropriate industry standards.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Ply" means a continuous layer of rubber-coated parallel cords.

"Radial" and "radially" means directions radially toward or away from the axis of rotation of the tire.

"Radial-ply tire" means a belted or circumferentially restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of a sidewall just below the tread edge.

Sidewall" means that portion of a tire between the tread and the bead.

"Tread width" means the arc length of the tread surface in the axial direction, that is, in a plane passing through the axis of rotation of the tire.

BRIEF DESCRIPTION OF THE DRAWINGS

FIG. 1 is a cross-sectional view of the right half portion of a cured, unmounted tire made in accordance with the invention;

FIG. 2 is a cross-sectional view of a bead portion made according to the invention, unmounted on a rim;

DETAILED DESCRIPTION OF THE INVENTION

Figure 3:
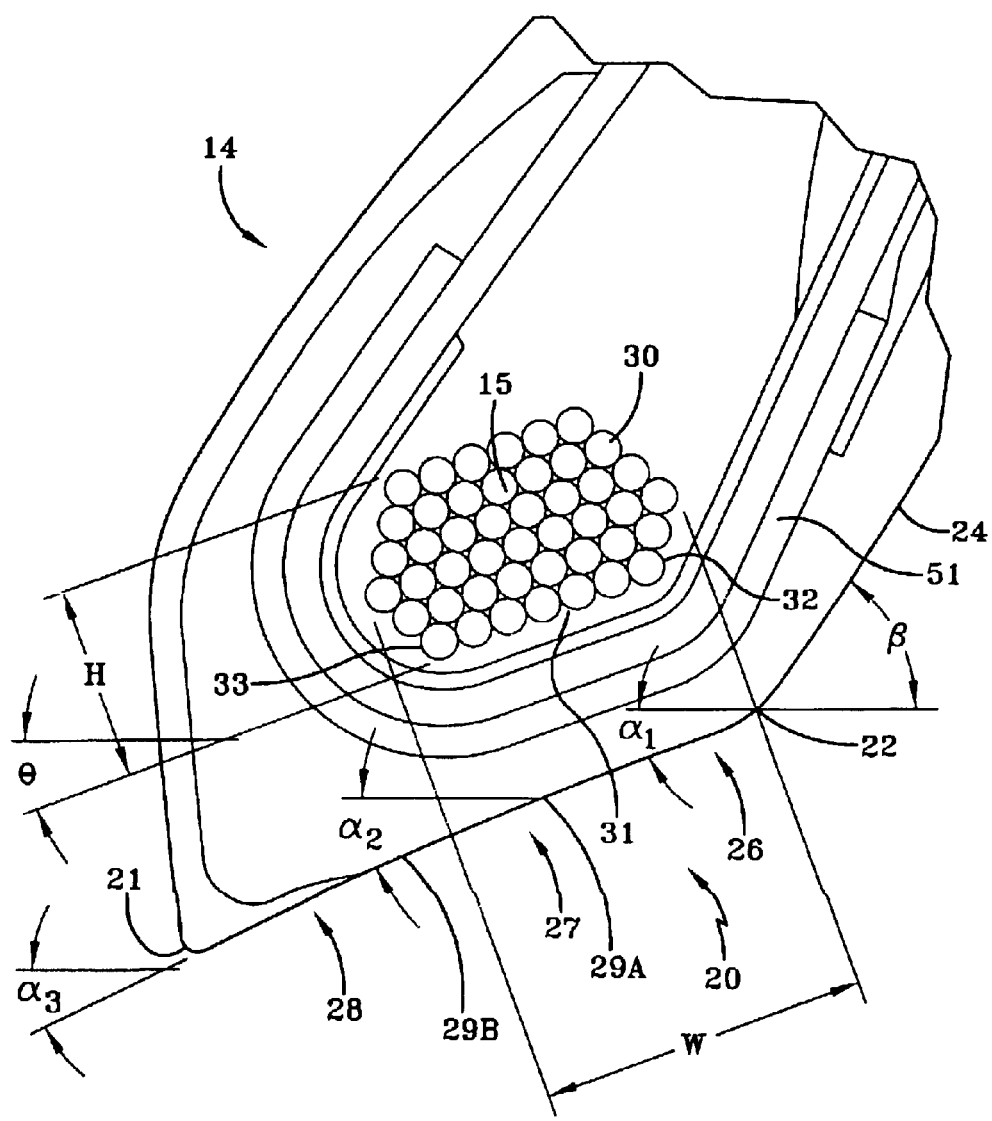
FIG. 3 is an enlarged cross sectional view of the bead portion taken from FIG. 2.

Although the invention is not limited to any particular type of tires, we will use an exemplary radial-ply truck tire 10 for illustration. Referring to FIG. 1, there is illustrated a cross sectional view of the right half portion of a cured, unmounted tire 10 made in accordance with the present invention. In the particular embodiment, the tire 10 is a 315/80R22.5 truck tire.

The tire 10 is provided with a ground-engaging tread portion 11, which terminates in the shoulder portions 12 at the lateral edges of the tread. Axially outer sidewall portion 13 extends from shoulder portion 12 and terminates in the bead portion 14, the bead portion having an annular inextensible tensile member or bead core 15. The tire 10 is further provided with a carcass reinforcing structure 16 which extends from the tensile member 15 through the sidewall portion 13, the tread portion 11, the opposite sidewall portion (not represented) down to the opposite tensile member (not represented). The turnup ends 17 of the carcass reinforcing structure 16 are wrapped about the tensile members 15. As illustrated, the bead portion 14 has a toeguard wrapped about the carcass reinforcing structure 16 and the tensile member 15. The tire 10 may include a conventional innerliner 18 forming the inner peripheral surface of the tire 10 if the tire is to be of the tubeless type.

Placed circumferentially about the radially outer surface of the carcass reinforcing structure 16, beneath the tread portion 11, is a tread reinforcing belt structure 19. In an exemplary embodiment, the belt structure 19 comprises four single cut belt plies and the cords of the belt plies are oriented at an angle ranging between 20° and 60° with respect to the equatorial plane of the tire. The cords of neighboring plies are disposed in opposite directions with respect to the equatorial plane (EP) of the tire. However, the belt structure 19 may comprise any number of belt plies of any desired configuration and the cords may be disposed at any desired angle.

The carcass reinforcing structure 16 includes at least one reinforcing ply, each comprising one layer of parallel cords. The cords of the reinforcing ply are oriented at an angle of at least 75° with respect to the equatorial plane EP for radial-ply tires. The cords reinforcing the carcass ply may be of any material normally used for cord reinforcement of rubber articles, for example, and not by way of limitation, steel, rayon, aramid, nylon and polyester.

Before mounting the tire 10 on a rim and inflating it, it has the shape imparted to it by the mold, with slight changes due to cooling from the curing temperature. After mounting the tire 10 on the rim, the inclination of the bead portions 14 of the tire is imposed by the rim.

Referring now to FIG. 2, the bead portion 14 has a first annular surface located between the bead toe 21 and the bead heel 22. The first annular surface has a specified profile, herein referred to as the bead seat profile 20, when the bead portions 14 are spaced a distance equal to the nominal molded base width, it being understood that the molded base width is not necessarily equal to the design rim width. For the purpose of this specification, the design rim width is the width of the rim on which the tire is to be mounted if only one rim size will be used If the tire 10 is designed to fit rims of sizes in a range, then the design rim width is the average of the specified maximum and minimum rim widths, the widths being measured axially between the rim flanges. The range of rim widths is established by the industry standards applicable where the tire is made. In the United States, for example, the Tire and Rim Association standards have established a range of recommended rim widths for "15° drop center" type rims in the 17.5" to 24.5" rim diameter size, the range of widths for a rim being 5.25 to 15.00 inches (133.5 to 381 mm). The design rim width as defined in the application, therefore is 9.00 inches (228.5 mm) for the 315/80R22.5 tire.

The bead portion 14 has a second annular surface 24 that extends radially outwardly from the bead heel 22. For a tire mounted on the rim, see FIG. 5, the second surface 24 is oriented at an angle of approximately 60 degrees with respect to the axis of rotation. Extending from the second surface 24 is a curved contact pressure distribution which depends on the geometrical relationship between the tire's bead area and the rim, the construction and position of the bead core, the inflation pressure, and other tire loads such as vertical, lateral, and centrifugal forces.

FIG. 3 is an enlarged cross sectional view of the bead portion 14 of the unmounted tire 10 in FIG. 1. The bead seat profile 20 extends from the heel end 22 to the toe end 21. The bead core has a width W comprised between 15 and 21 mm and preferably between 17 and 19 mm and a height H comprised between 8 and 11 mm and preferably about 10 mm. The reduced width W and height H as compared to a prior art tire result in a reduced cross-section of the bead core 15 which is comprised between 160 and 130 mm$^2$ and preferably between 140 and 150 mm$^2$. This smaller bead cross section facilitates during mounting of the tire on the rim, the angular rotation that locks the ply between the axially outer ends of the bead core.

Figure 5:
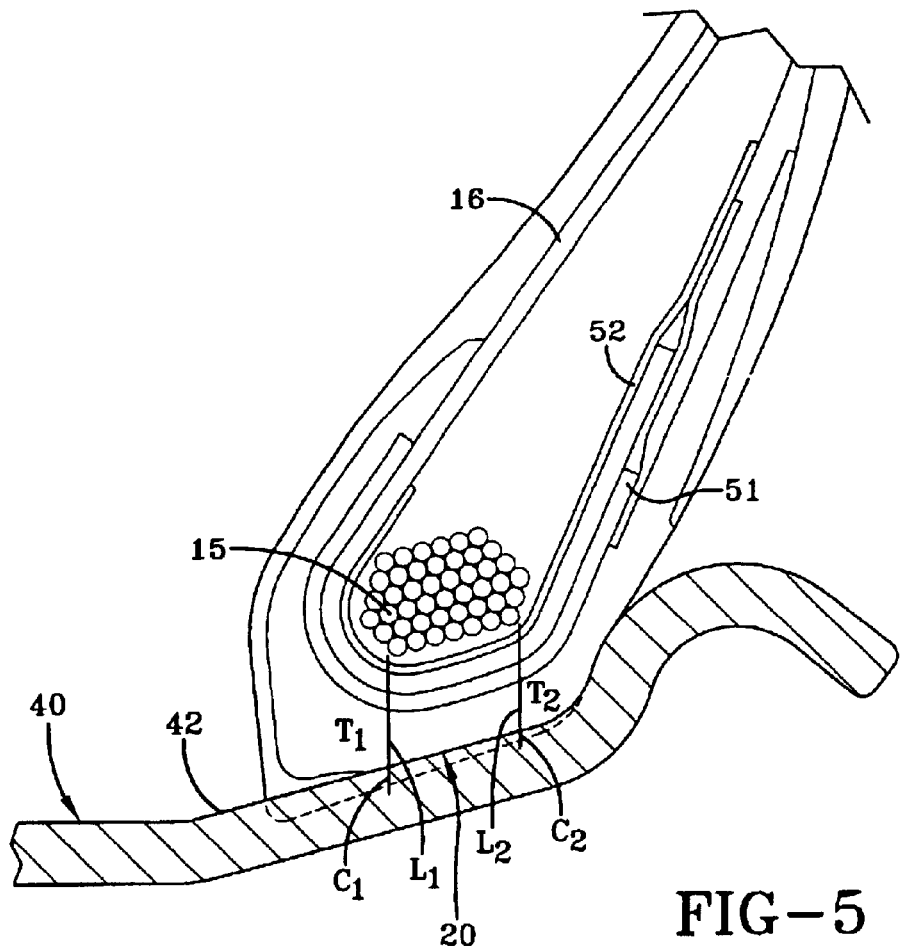
FIG. 5 shows the bead profile of the tire in FIG. 3, superimposed on the design rim profile.

As shown in FIG. 5 the flat bead base 31 has an axially inner end 33 spaced at a distance of $T_1$ above the bead seat profile on a line $L_1$ passing through the end 33 and perpendicular to the axis and at the axially outer end 32 the distance $T_2$ plus above the bead seat profile on the line $L_2$ passing through the outer end 32 and perpendicular to the axis, the distance $T_1$ being greater than $T_2$ and in combination with the bead seat profile the distance $T_1$ as measured between the bead base axially inner end 32 and the bead seat profile on line $L_1$ and $T_2$ as measured at the axially outer end 32 of the bead base on line $L_2$ The unmounted tire has compression of the bead seat profile when mounted to the rim. This compression at $T_1$ is $C_1$ and the compression at $T_2$ is $C_2$, wherein the amount of compression $C_1$ is a few millimeters, preferably at least 1 millimeter which is at least twice $C_2$.

These features impart an angular rotation on the bead core 15 forcing the axially inner end 33 of the bead base 31 to rotate pinching the ply firmly against the rim seat near the rim flange. As the tire inflates the ply contributes a further rotational force onto the bead core and increases the tightening of the ply between the bead core 15 and the rim 40 locking the structure in place. The small almost rectangular shape of the bead core 15 has the width W greater than twice the height H. As a result the bead core rotates more easily than round or squarish type hexagonal bead cores. The resultant design has a very light weight but because the bead core has a high vertical inclination it is very resistant to radial expansion. This means the tire has a very high burst pressure but is several kilograms lighter in weight in the bead area due to the efficiently small size.

Figure 4:
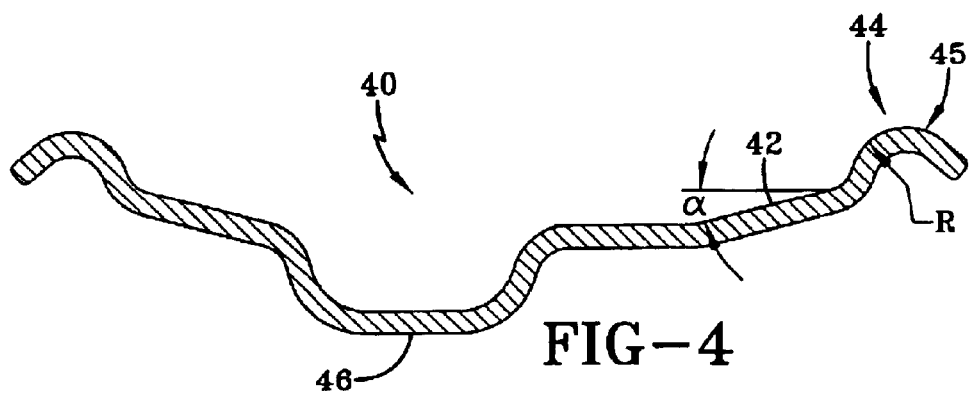
FIG. 4 shows a design rim for truck tires.

In FIG. 4, a design rim 40 and more specifically a one-piece tubeless drop center rim is shown. The rim has a well (drop center) 46, a ledge 42 inclined at a taper angle which is nominally 15° for a truck tire rim, relative to the axis of rotation, and a flange 44 which is rounded with a radius of curvature of about 13 mm. Between the flange 44 and the ledge 42, the rim 40 has another smaller radius of curvature. At the radially outer portion 45 of the rim flange, the surface of the flange has another radius of curvature.

With reference again to FIG. 3, a preferred arrangement of bead core filaments is shown. The bead core is shown in cross-section and comprises a series of wire filaments 30. The bead core 15 is preferably comprised of a single continuous filament annularly wound In other words each of the filaments shown in cross-section is part of the same continuous filament which in the preferred embodiment has a diameter of about 2 mm and more specifically 2.08 mm if individually coated with elastomeric material. As represented the bead core comprises six layers of filaments 30. The first layer, which is the radially inner layer, is obtained by winding the filament annularly seven times. The second layer, adjacent to and radially outward of the first layer is obtained by eight windings. It is important that the filaments of adjacent layers be nested together; in other words, the filaments 30 are axially offset by a distance equal to one-half the diameter of a filament. The third layer comprises 9 annular windings, the fourth layer 8, the fifth 7 and the sixth 6. The bead core is wound in away to outline in cross-section a hexagon having a radially inner base 31 having a heel end 32 and a toe end 33. In a tire as molded and unmounted on the design rim, the radially inner base 31 forms an angle Θ of 18 to 22 degrees and preferably about 20 degrees with respect to the axis of the tire.

According to the invention the first annular surface or bead seat profile 20 of the bead seat profile has at least two and preferably at least three portions with different taper angles. The first portion 26, close to the bead heel has a taper angle α1—on a tire as molded and unmounted on its design rim—of about 20° with respect to the axis of the tire. It is important to note that the inclination of the first portion 26 of the bead seat profile 20 is substantially parallel to the radially inner base 31 of the bead core 15. The second portion 27, adjacent to the first portion and closer to the bead toe 21, has a taper angle α2 superior by about 8° to the taper angle of the first portion 26 or of about 28° with respect to the axis of the tire. The transition point 29A of the taper angles of the first and second portion ranges/lies between 20 and 40% and preferably between 25 and 35% of the extent of the first annular surface 20. Preferably the tire bead has also a third portion 28, close to the bead toe with a taper angle α3 superior by about 7° to the taper angle of the second portion 26 or of about 35°. The location of the transition point 29B of the taper angles of the second and third portion is not critical and lies close to the middle of the surface (in fact bead seat profile line in the considered axial cross-section) extending between point 29A and the bead toe 21; alternatively the portion of the surface extending between point 29A and the bead toe 21 may be continuously rounded, so that a tangent to the bead seat profile line at point 29A has a value of about 20 degrees with respect to the axis of the tire and a tangent close to the bead toe has a value comprised between 28 and 37 degrees, preferably of about 35 degrees. The bead toe 21 may either be rounded off as shown in FIG. 3 or may have an acute rubber tip (as represented in FIG. 2). Alternatively, the bead toe can have a small flat or horizontally extending end that is straight and substantially parallel to the axis of the tire. The small flat has a width ranging between 10 and 15% of the extent of the bead seat profile. This feature improves the cut resistance and durability at the bead toe for tire mounting, avoiding the acute edge from being cut or torn.

It is not critical for the inventive idea if the bead seat profile 20 includes two portions wherefrom the second one is continuously curved or three or more portions which are substantially straight. However, it is essential that the first portion 26 of the bead seat profile is substantially straight, parallel to the radially inner base 31 of the bead core 15 and that the inclination of the radially inner bead core base 31 is close to 20 degrees with respect to the axis of the tire. Also, the bead seat profile has an axial length of 70% of the axial length of the ledge.

FIG. 5 shows the bead according to the invention mounted on a drop center tire rim. Apart from the bead core 15, the carcass ply 16, the chipper 51 and a flipper 52 can be distinguished on this drawing. The tire has been inflated to its nominal pressure which is about 100 psi (700 kPa). During mounting and inflation, as is the case for most tires, the bead core 15 moved radially and axially outward, and rotated clockwise—if the bead cross-section is viewed with the toe end 21 on the left side—. The bead seat profile base 20 has been pushed forcefully against the rim and is now straight on its whole length; it has an inclination angle equal to the inclination angle of the rim ledge, namely 15°. Similarly the bead core base 31 is also inclined at an angle of about 15°. The bead seat profile has an axial length of 70% of the axial length of the ledge.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire as molded, to be mounted on a one-piece tubeless drop center rim having a ledge inclined at a taper angle of 15°, comprising a pair of bead portions, each bead portion having a bead core, each bead core having a bead base, radially inward of and wider than each bead base there being a bead seat profile, the bead seat profile having at least two portions with different taper angles the first portion, close to the bead heel being substantially straight and having an inclination close to 20 degrees with respect to the axis of the tire;

the second and further portions, adjacent to the first portion and closer to the bead toe, being curved or straight, with increasing inclinations with respect to the axis of the tire; and the first portion of the bead seat profile being substantially parallel to the radially inner base of the bead core and wherein the bead seat profile has at least a third portion close to the bead toe with a taper angle as molded of about 35° with respect to the axis of the tire.

2. The pneumatic tire of claim 1 wherein the inclinations of the second and further portions of the bead seat profile increase up to 35 degrees with respect to the axis of the tire.

3. The pneumatic tire of claim 1 wherein the bead core has a hexagonal cross-section with a section comprised between 130 and 160 cm$^2$.

4. The pneumatic tire of claim 1 wherein the bead core has a hexagonal cross-section and is comprised of a single continuous filament annularly wound in six layers of filaments, whereby the first radially inner layer is obtained by winding the filament annularly seven times, the second layer, adjacent to and radially outward of the first layer is obtained by eight windings, the third layer by 9, the fourth layer by 8, the fifth by 7 and the sixth by 6 annular windings.

5. A pneumatic tire as molded, to be mounted on a one-piece tubeless drop center rim having a ledge inclined at a taper angle of 15°, comprising a pair of bead portions, each bead portion having a bead core, each bead core having a bead base, radially inward of and wider than each bead base there being a bead seat profile, the bead seat profile having at least two portions with different taper angles the first portion, close to the bead heel substantially parallel to the bead core base and having a taper angle of about 20° with respect to the axis of the tire;

the second portion, adjacent to the first portion and closer to the bead toe, with a taper angle as molded and having a taper angle of about 28° with respect to the axis of the tire and wherein the bead seat profile has at least a third portion close to the bead toe with a taper angle as molded of about 35° with respect to the axis of the tire.

6. The pneumatic tire of claim 5 wherein the bead seat profile has a fourth portion adjacent to the bead toe having a taper angle of about zero degrees with respect to the axis of the tire.

7. The pneumatic tire of claim 5 wherein the bead seat profile has an axial length of 70% of the axial length of the ledge.

8. The pneumatic tire of claim 1 wherein the portion closest to the bead toe is straight and substantially parallel to the axis of the tire.

* * * * *